US010922797B1

(12) United States Patent
Peana et al.

(10) Patent No.: US 10,922,797 B1
(45) Date of Patent: Feb. 16, 2021

(54) DISPLAY SPECULAR REFLECTION MITIGATION

(71) Applicant: Dell Products L.P., Round Rock, TX (US)

(72) Inventors: Stefan Peana, Austin, TX (US); Deeder M. Aurongzeb, Austin, TX (US)

(73) Assignee: Dell Products L.P.

( * ) Notice: Subject to any disclaimer, the term of this patent is extended or adjusted under 35 U.S.C. 154(b) by 0 days.

(21) Appl. No.: 16/540,389

(22) Filed: Aug. 14, 2019

(51) Int. Cl.
*G09G 3/20* (2006.01)
*G06T 5/00* (2006.01)

(52) U.S. Cl.
CPC ............ *G06T 5/008* (2013.01); *G09G 3/20* (2013.01); *G09G 2320/068* (2013.01); *G09G 2320/0626* (2013.01); *G09G 2354/00* (2013.01); *G09G 2360/144* (2013.01)

(58) Field of Classification Search
CPC .... G06T 5/008; G09G 3/20; G09G 2320/068; G09G 2320/0626; G09G 2354/00; G09G 2360/144
See application file for complete search history.

(56) References Cited

U.S. PATENT DOCUMENTS

| 2013/0328944 A1* | 12/2013 | Barnhoefer | G09G 3/006 345/690 |
| 2017/0039958 A1* | 2/2017 | Ghosh | G09G 5/003 |
| 2017/0329399 A1* | 11/2017 | Azam | F02M 67/12 |
| 2018/0012561 A1* | 1/2018 | Yoon | G01D 5/2066 |
| 2018/0330697 A1* | 11/2018 | Lee | G09G 5/373 |

* cited by examiner

*Primary Examiner* — Lunyi Lao
*Assistant Examiner* — Jarurat Suteerawongsa
(74) *Attorney, Agent, or Firm* — Baker Botts L.L.P.

(57) ABSTRACT

Methods, systems, and computer programs encoded on computer storage mediums for providing, for display on a display device, GUI having an image, each pixel of the image associated with a particular brightness; identifying external incoming light that is incident on the display device; measuring, by a sensor array within the display device, a brightness of the incoming light at locations of the display device; calculating, by a display adjustment computing module, a normal distribution of the brightness of the incoming light across the display device based on the measured brightness at the locations of the display device; determining, by the display adjustment computing module, that a brightness distribution of the incoming light is greater than the normal distribution of the brightness of the incoming light across the display device; and, in response, adjusting, by the display adjustment computing module, the particular brightness of one or more pixels of the image.

20 Claims, 5 Drawing Sheets

DISPLAY SPECULAR REFLECTION MITIGATION

BACKGROUND

Field of the Disclosure

The disclosure relates generally to information handling systems, and in particular, display specular reflection mitigation of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To mitigate display surface reflectivity, the industry is using such approaches as anti-reflection (AR), anti-glare (AG), or a combination of both. Light sources present in an office environment can present a challenge to the AR as the brightness of the light source is concentrated, specular reflection (point source or line source), and is several orders of magnitude higher than the average office illumination environment.

SUMMARY

Innovative aspects of the subject matter described in this specification may be embodied in methods including providing, for display on a display device, a graphical user interface (GUI) having an image, each pixel of the image associated with a particular brightness; identifying external incoming light that is incident on the display device; measuring, by a sensor array within the display device, a brightness of the incoming light at a plurality of locations of the display device; calculating, by a display adjustment computing module, a normal distribution of the brightness of the incoming light across the display device based on the measured brightness at the plurality of locations of the display device; determining, by the display adjustment computing module, that a brightness distribution of the incoming light that is incident on a particular area of the display device is greater than the normal distribution of the brightness of the incoming light across the display device; and in response to determining that the brightness distribution of the incoming light that is incident on a particular area of the display device is greater than the normal distribution of the brightness of the incoming light across the display device, adjusting, by the display adjustment computing module, the particular brightness of one or more pixels of the image.

Other embodiments of these aspects include corresponding systems, apparatus, and computer-readable mediums.

These and other embodiments may each optionally include one or more of the following features. For instance, adjusting the particular brightness of the one or more pixels of the image includes decreasing the brightness of the pixels of the image that correspond to the particular area of the display device. Adjusting the particular brightness of the one or more pixels of the image includes increasing the brightness of the pixels of the image that correspond to areas of the display device outside of the particular area of the display device. Adjusting the particular brightness of the one or more pixels of the image includes i) decreasing the brightness of the pixels of the image that correspond to the particular area of the display device and ii) increasing the brightness of the pixels of the image that correspond to areas of the display device outside of the particular area of the display device. Determining, by the display adjustment computing module, that the brightness distribution of the incoming light that is incident on the particular area of the display device is greater than a threshold brightness; and in response to determining that the brightness distribution of the incoming light that is incident on the particular are of the display device is greater than the threshold brightness, adjusting, by the display adjustment computing module, the particular brightness of the one or more pixels of the image. Identifying a location of a user with respect to the display device; and identifying a location of a light source providing the incoming light that is incident on the display device, wherein adjusting the particular brightness of the one or more pixels of the image further includes adjusting the particular brightness of the one or more pixels of the image based on the location of the user and the location of the light source. The location of the user includes identifying a viewing angle of the user with respect to the normal of the display device, wherein identifying the location of the light source includes identifying an angle of incidence of the incoming light provided by the light source, and wherein the particular brightness of the one or more pixels of the image is adjusted based on i) the viewing angle of the user and ii) the angle of incidence of the incoming light.

Innovative aspects of the subject matter described in this specification may be embodied in systems including a display device providing for display a graphical user interface (GUI) having an image, each pixel of the image associated with a particular brightness; an array of sensors coupled to the display device, the array of sensors measuring a brightness of external incoming light that is incident on the display device at a plurality of location of the display device; a display adjustment computing module configured to: calculate a normal distribution of the brightness of the incoming light across the display device based on the measured brightness at the plurality of locations of the display device; determine that a brightness distribution of the incoming light that is incident on a particular area of the display device is greater than the normal distribution of the brightness of the incoming light across the display device; and adjust, in response to determining that the brightness distribution of the incoming light that is incident on a particular area of the display device is greater than the normal distribution of the brightness of the incoming light across the display device, the particular brightness of one or more pixels of the image.

Other embodiments of these aspects include corresponding methods, apparatus, and computer-readable mediums.

These and other embodiments may each optionally include one or more of the following features. For instance, adjusting the particular brightness of the one or more pixels of the image includes decreasing the brightness of the pixels of the image that correspond to the particular area of the display device. Adjusting the particular brightness of the one or more pixels of the image includes increasing the brightness of the pixels of the image that correspond to areas of the display device outside of the particular area of the display device. Adjusting the particular brightness of the one or more pixels of the image includes i) decreasing the brightness of the pixels of the image that correspond to the particular area of the display device and ii) increasing the brightness of the pixels of the image that correspond to areas of the display device outside of the particular area of the display device. The display adjustment computing module is further configured to: determine that the particular brightness of the one or more pixels of the image is greater than a threshold brightness; and in response to determining that the particular brightness of the one or more pixels of the image is greater than the threshold brightness, adjust the particular brightness of the one or more pixels of the image. A camera that identifies i) a location of a user with respect to the display device and ii) a location of a light source providing the incoming light that is incident on the display device, wherein the adjustment computing module is configured to adjust the particular brightness of the one or more pixels of the image based on the location of the user and the location of the light source. Identifying the location of the user includes identifying a viewing angle of the user with respect to the normal of the display device, wherein identifying the location of the light source includes identifying an angle of incidence of the incoming light provided by the light source, and wherein the particular brightness of the one or more pixels of the image is adjusted based on i) the viewing angle of the user and ii) the angle of incidence of the incoming light.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a system and a method for mitigation of specular reflection of display devices. Specifically, the display device can include an array of sensors that can sense incoming light that is incident on the display device. A particular spot of the display device can have a higher than normal distribution of the incoming light that is sensed by the optical sensor. The brightness intensity of the particular spot ("hotspot") can be compared to the incoming image to determine if mitigation of the "hotspot" is needed (e.g., higher than a threshold). The "hotspot" can be mitigated—that is, the specular reflection at the "hotspot" can be mitigated by modifying the image content.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
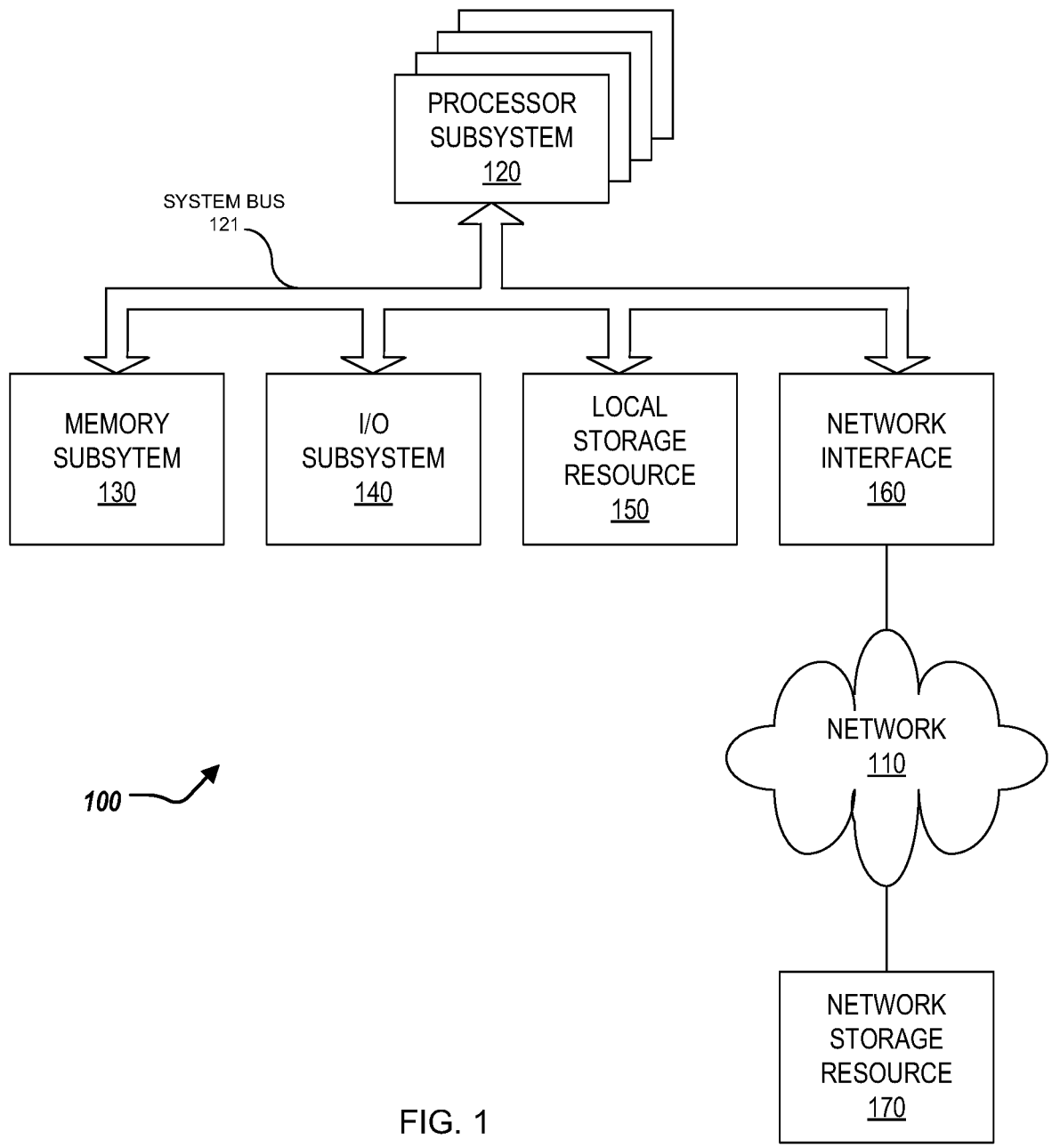
FIG. 1 is a block diagram of selected elements of an embodiment of an information handling system.
Figure 2:
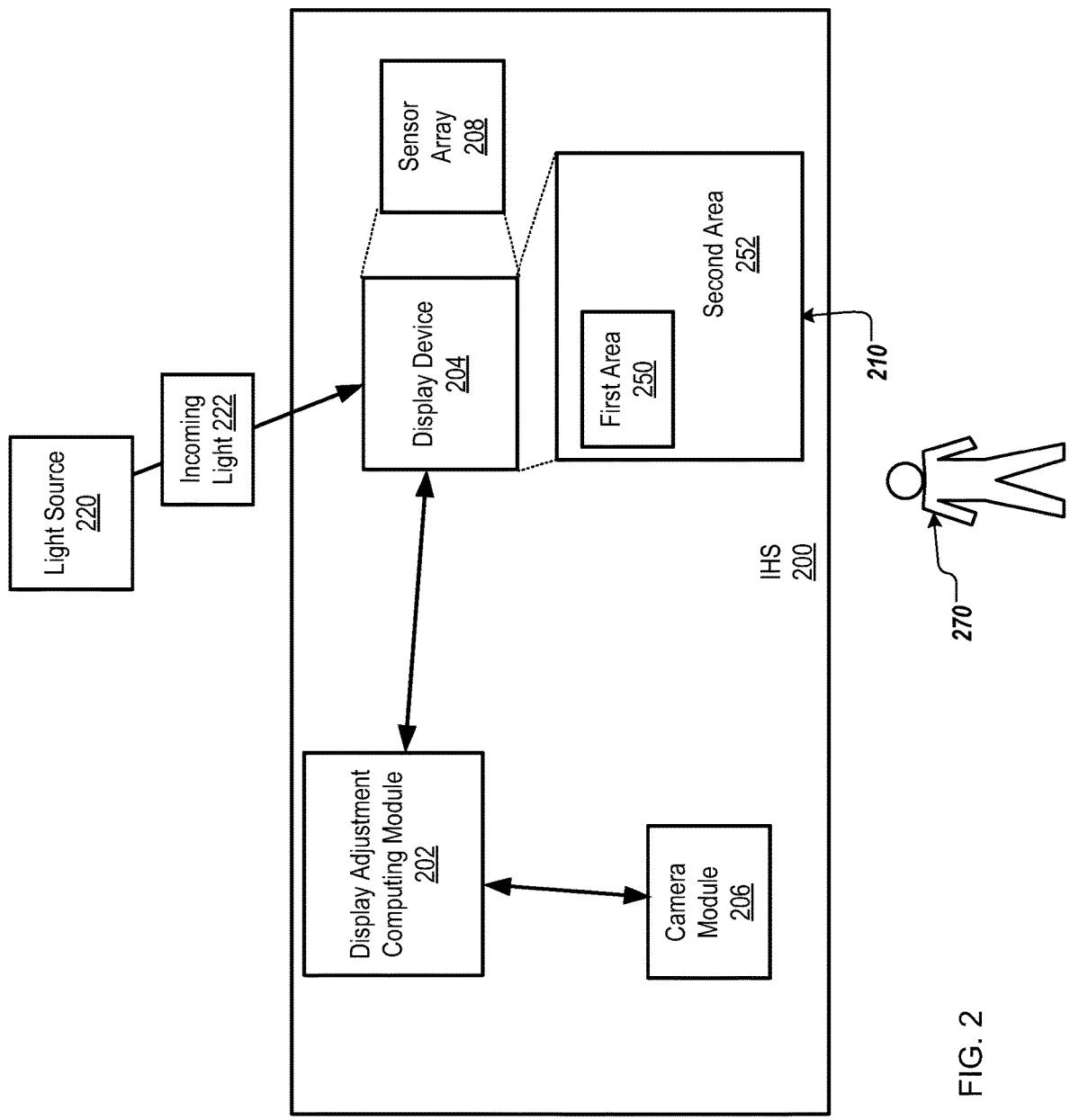
FIG. 2 is a block diagram of an information handling system for specular reflection mitigation.
Figure 3:
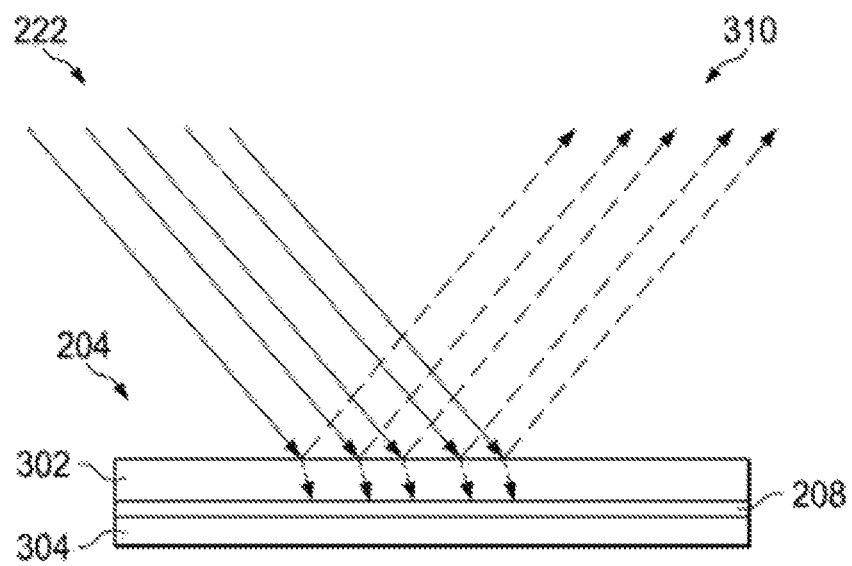
FIG. 3 illustrates an example cross-sectional view of a display device.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning now to FIG. 2, FIG. 2 illustrates an information handling system (IHS) 200 for display specular reflection mitigation. Specifically, the IHS 200 can include a display adjustment computing module 202, a display device 204, and a camera module 206. The display adjustment computing module 202 can be in communication with the display device 204 and the camera module 206. The display device 204 can be coupled to or include a sensor array 208 (an optical sensor array 208). The display device 204 can provide for display a graphical user interface (GUI) having an image 210. The image 210 can include a plurality of pixels each associated with a particular brightness (or particular luminance). The IHS 200 can be similar to the information handling system 100 of FIG. 1.

To that end, the IHS 200, and in particular the display device 204, can experience specular reflection. Specifically, a light source 220 can provide incoming light 222 that is incident on the display device 204. In some examples, the light source 220 can include multiple light sources of distinct sizes that provide different illumination intensities and/or different color temperatures. The IHS 200, and in particular, the display adjustment computing module 202, can mitigate the specular reflection upon the display device 204, and in particular, perform intensity and/or color correction of the display device 204.

FIG. 3 illustrates an example cross-sectional view of the display device 204. The display device 204 can include a (glass) cover 302, the sensor array 208, and a backlight 304. In some examples, the sensor array 208 is incorporated in the display pixels of the display device 204. In some examples, the sensor array 208 is a transparent film. In some examples, the sensor array 208 can be physically located on top of the glass cover 302, or between the glass cover 302 and the backlight 304. In some examples, the display device 204 is a LCD display device, or a micro-LED display device.

As shown, the incoming light 222 can be reflected by the display device 204 (e.g., the (glass) cover 302) as reflected light 310. The angle of reflection of the reflected light 310 with respect to the display device 204 (e.g., specular reflection) is equal to the angle of incidence of the incoming light 222.

Turning back to FIG. 2, in some implementations, the display adjustment computing module 202, and in particular, the sensor array 208, can identify the external incoming light 222 that is incident on the display device 204. The sensor array 208 can measure a brightness of the incoming light 222 at a plurality of locations of the display device 204. In some examples, the sensor array 208 can measure, for each area of the display device 202 that corresponds to each pixel or each grouping of pixels, measure a brightness (or luminesce) of the incoming light 222. In some examples, the sensor array 208 can include a plurality of individual sensors each associated with an area of the display device 204 and/or associated with a grouping of pixels. Each sensor of the sensor array 208 can measure the brightness (or luminesce) corresponding to the associated area of the display device 204, or grouping of pixels corresponding to such an area of the display device 204.

The sensor array 208 can provide data indicating the brightness of the incoming light 222 to the display adjustment computing module 202. For example, the sensor array 208 can provide data including the brightness (or luminesce) for one or more areas of the display device 202 that corresponds to each pixel or grouping of pixels of the display device 202. The sensor array 208 can provide data indicating the incoming light 222 to the display adjustment computing module 202 periodically, or in response to a request. To that end, based on the data from the sensor array 208 indicating the brightness of the incoming light 222 that is incident on the display device 204, the display adjustment computing module 202 can measure calculate a normal distribution of the brightness of the incoming light 222 across the display device 204. Specifically, the display adjustment computing module 202 can calculate the normal distribution of the brightness of the incoming light 222 across the display device 204 based on the measured brightness of the incoming light 222 at the plurality of locations of the display device 204.

In some implementations, the display adjustment computing module 202 can compare the brightness of the incoming light 222 that is incident on the display device 204 for one or more areas of the displace device 204 to the normal distribution of the brightness of the incoming light 222 that is incident on the display device 204. For example, the display adjustment computing module 202 can compare the brightness of the incoming light 222 that is incident on the display device 204 for the first area 250 to the normal distribution of the brightness of the incoming light 222 that is incident on the display device 204. The display adjustment computing module 202 can determine that the brightness distribution of the incoming light 222 that is incident on the display device 204 for the first area 250 is greater than the normal distribution of the brightness of the incoming light 222 that is incident on the display device 204 across the display device 204 (e.g., utilizing a 1D or 2D histogram). In other words, the display adjustment computing module 202 can determine that the incoming light 222 is incident primarily (concentrated) on the first area 250 of the display device 204. That is, the display adjustment computing module 202 can determine that the intensity of the incoming light 222 that is incident on the display device 204 is greater for the first area 250 than the remaining areas of the display device 204.

In some implementations, the display adjustment computing module 202 can, in response to determining that the brightness distribution of the incoming light 222 that is incident on the first area 250 of the display device 204 is greater than the normal distribution of the brightness of the incoming light 222 that is incident on the display device 204 across the display device 204, adjust the particular brightness of one or more pixels of the image 210. In other words, the display adjustment computing module 202 can compensate for the specular reflection of the incoming light 222 and adjust the image 210 and the display device 204 accordingly.

In some examples, the display adjustment computing module 202 can adjust the particular brightness of the pixels of the image 210 by decreasing the brightness of the pixels of the image 210 that correspond to the first area 250 of the display device 204. That is, the display adjustment computing module 202 can interface with the display device 204 to decrease the brightness (or luminesce) of the pixels of the image 210 that corresponds to the first area 250. In some examples, the display adjustment computing module 202 can adjust the particular brightness of the pixels of the image 210 by increasing the brightness of the pixels of the image 210 that correspond to a second area 252 that is outside of the first area 250 of the displace device 204. That is, the display adjustment computing module 202 interface with the display device 204 to increase the brightness (or luminesce) of the pixels of the image 210 that correspond to the second area 252. In some examples, the display adjustment computing module 202 can adjust the particular brightness of the pixels of the image 210 by i) decreasing the brightness of the pixels of the image 210 that correspond to the first area 250 of the display device 204 and ii) increasing the brightness of the pixels of the image 210 that correspond to a second area 252 that is outside of the first area 250 of the displace device 204. That is, the display adjustment computing module 202 can interface with the display device 204 to i) decrease the brightness (or luminesce) of the pixels of the image 210 that corresponds to the first area 250 and ii) increase the brightness (or luminesce) of the pixels of the image 210 that correspond to the second area 252.

In some examples, the display adjustment computing module 202 can access a database (not shown) to access a look-up table (LUT) that can store associations between brightness values of the pixels of the image 210 and the brightness of the incoming light 222. That is, for each detected level of brightness of the incoming light 222 that is incident on the display device 204, and in particular, the first area 210, the LUT can store an associated level of increase and/or decrease of brightness of the pixels of the image 210 provided for display on the displace device 204.

In some examples, the display adjustment computing module 202 can, in response to determining that the brightness distribution of the incoming light 222 that is incident on the first area 250 of the display device 204 is greater than the normal distribution of the brightness of the incoming light 222 that is incident on the display device 204 across the display device 204, adjust a color of one or more pixels of the image 210. In some examples, the display adjustment computing module 202 can adjust the color of the pixels of the image 210 by i) performing a first color adjustment of the pixels of the image 210 that correspond to the first area 250 of the display device 204 and ii) performing a second color adjustment of the pixels of the image 210 that correspond to a second area 252 that is outside of the first area 250 of the displace device 204.

In some examples, the display adjustment computing module 202 can compare the brightness of the incoming light 222 that is incident on the display device 204 on the first area 250 of the displace device 204 to a threshold brightness. For example, the display adjustment computing module 202 can compare the brightness of the incoming light 222 that is incident on the display device 204 for the first area 250 to the threshold brightness. The display adjustment computing module 202 can determine that the brightness distribution of the incoming light 222 that is incident on the display device 204 for the first area 250 is greater than the threshold brightness. In other words, the display adjustment computing module 202 can determine that the incoming light 222 that is incident primarily (concentrated) on the first area 250 of the display device 204 is greater than a threshold brightness.

In some examples, the display adjustment computing module 202 can, in response to determining that the brightness distribution of the incoming light 222 that is incident on the first area 250 of the display device 204 is greater than the threshold brightness, adjust the particular brightness of one or more pixels of the image 210. In other words, the display adjustment computing module 202 can compensate for the specular reflection of the incoming light 222 that is greater than the threshold brightness and adjust the image 210 and the display device 204 accordingly. In some examples, the display adjustment computing module 202 can adjust the particular brightness of the pixels of the image 210 by i) decreasing the brightness of the pixels of the image 210 that correspond to the first area 250 of the display device 204 and/or ii) increasing the brightness of the pixels of the image 210 that correspond to a second area 252 that is outside of the first area 250 of the displace device 204.

In some examples, the camera module 206 can determine a location of a user 270 with respect to the display device 204 and a location of the light source 220 with respect to the display device 204. Specifically, an intensity of the incoming light 222 can vary based on the location of the user 270 and/or the location of the light source 220 with respect to the display device 204. For example, when the location of the user 270 is at angle with respect to the display device 204 that corresponds to an angle of the light source 220 is at with respect to the display device 204, the intensity of the brightness of the incoming light 222 at the first area 250 can be increased as perceived by the user 270.

Figure 4:
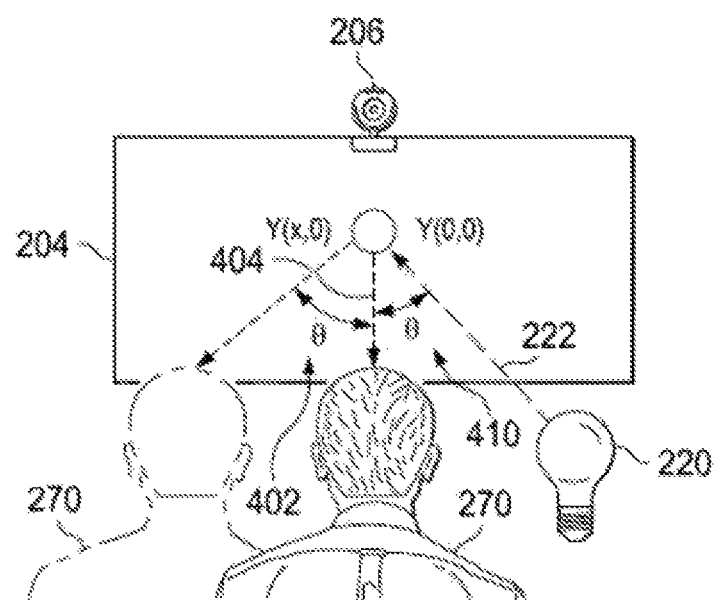
FIG. 4 illustrates a diagram of a user with respect to the display device.

Referring to FIGS. 2 and 4, in some examples, the camera module 206 can identify the location of the user 270 with respect to the display device 204. Specifically, the camera module 206 can identify a viewing angle 402 of the user 270 with respect to the normal 404 of the display device 204. The camera module 206 can identify the location of the light source 220 providing the incoming light 222 that is incident on the display device 204. Specifically, the camera module 206 can identify an angle of incidence 410 of the incoming light 222 provided by the light source 220 with respect to the normal 404 of the display device 204. The display adjustment computing module 202 can receive such data from the camera module 206 and can adjust the particular brightness of the pixels of the image 410 based on the location of the user 270 and the location of the light source 220. Specifically, the display adjustment computing module 202 can adjust the particular brightness of the pixels of the image based on i) the viewing angle 402 of the user 270 and ii) the angle of incident 410 of the incoming light 222.

Figure 5:
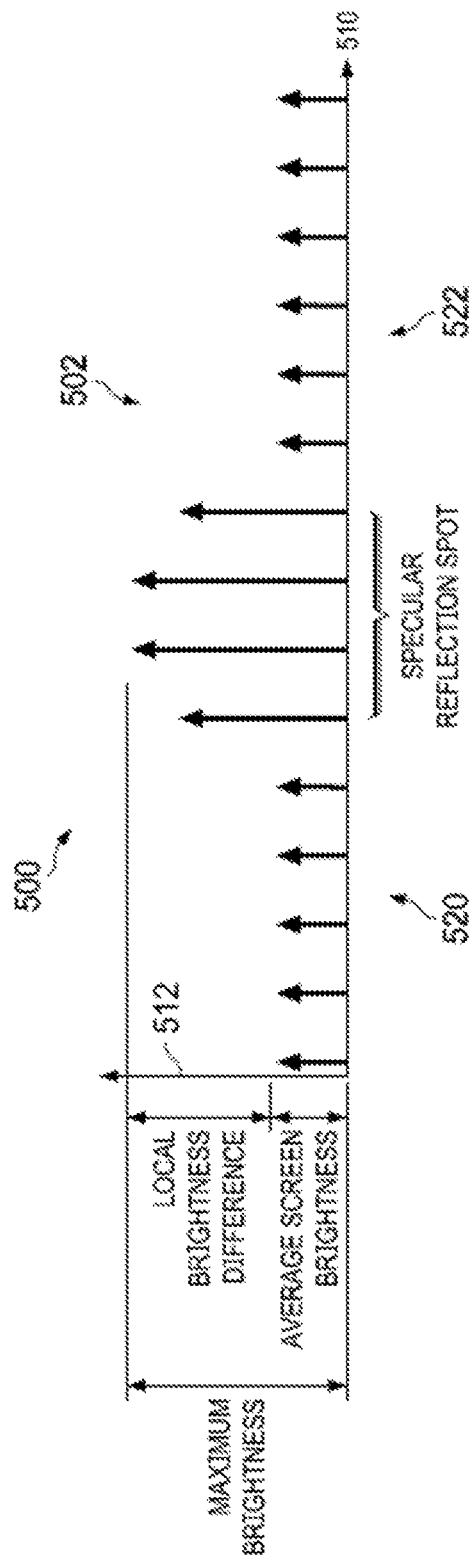
FIG. 5 illustrates a brightness graph of the display device.

FIG. 5 illustrates a display chart 500 indicating a specular reflection spot 502 that corresponds to the incoming light 222 that is incident on the display device 204 on the first area 250. Specifically, the display chart 500 displays the brightness of the display device 204 through a line intersecting the first area 250, show along axis 510, versus the brightness along the axis 512. The normal distribution of brightness of the display device 204 across the display device 204 can be shown by regions 520 and 522 of the chart 500.

Figure 6:
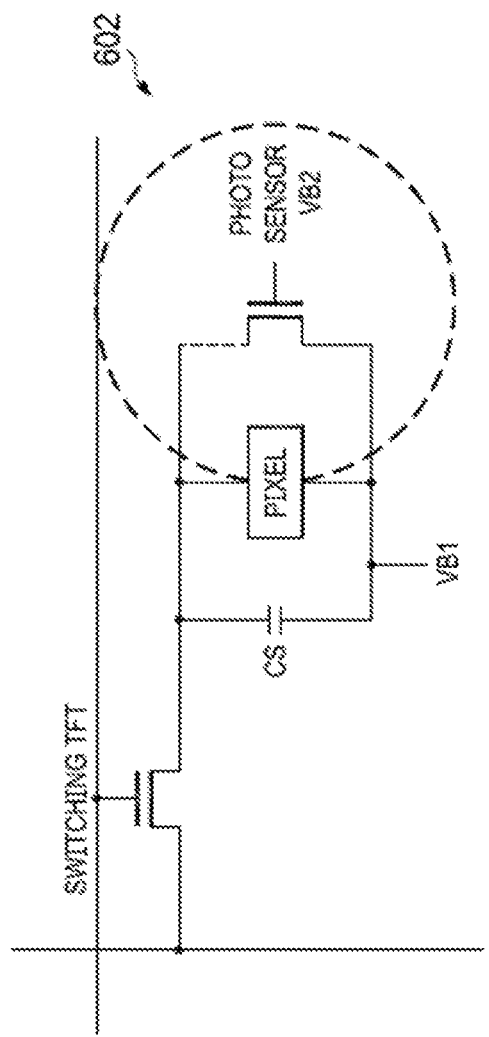
FIG. 6 illustrates a portion of an optical array.

FIG. 6 illustrates an optical sensor 602 of the sensor array 208. In some examples, the optical sensor 602 can include an in-pixel TFT layout with a photosensor.

Figure 7:
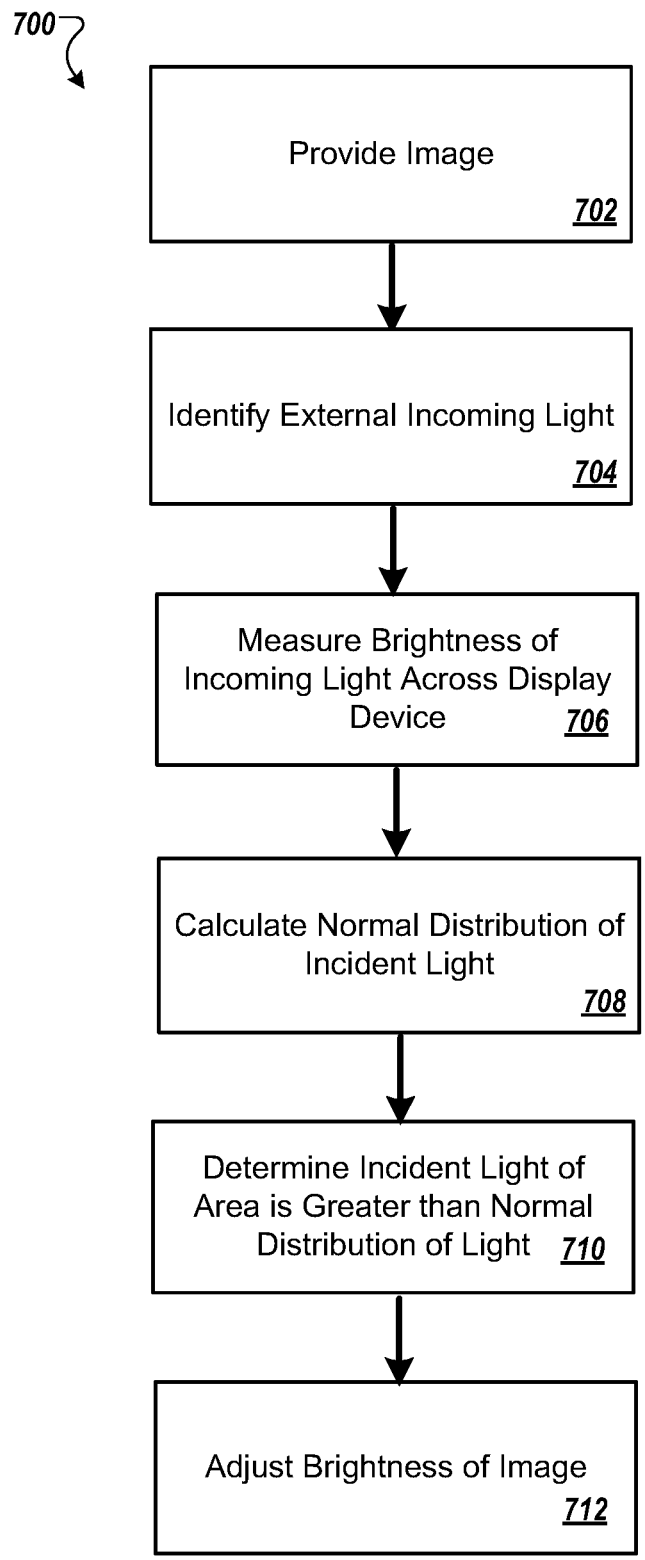
FIG. 7 illustrates a flowchart for specular reflection mitigation.

FIG. 7 illustrates a flowchart depicting selected elements of an embodiment of a method 700 for display specular reflection mitigation. The method 700 may be performed by the information handling system 100, the display adjustment computing module 202, and/or the IHS 200, described herein with reference to FIGS. 1-6, or another information handling system. It is noted that certain operations described in method 700 may be optional or may be rearranged in different embodiments.

A graphical user interface (GUI) having the image 210 is provided for display on the display device 204 (702). In some examples, each pixel of the image 210 associated with a particular brightness. External incoming light 222 is identified that is incident on the display device 202 (704). A brightness of the incoming light is measured by the sensor array 208 at a plurality of locations of the display device 204 (706). The display adjustment computing module 202 calculates a normal distribution of a brightness of the incoming light 222 that is incident on the display device 204 across the display device 204 based on the measured brightness at the plurality of locations of the display device 204 (708). The display adjustment computing module 202 determines that a brightness distribution of the incoming light 222 that is incident on the first area 250 of the display device 204 is greater than the normal distribution of the brightness of the incoming light 222 that is incident on the display device 204 across the display device 204 (710). In response to determining that the brightness distribution of the incoming light that brightness distribution of the incoming light 222 that is incident on the first area 250 of the display device 204 is greater than the normal distribution of the brightness of the incoming light 222 that is incident on the display device 204 across the display device 204, the display adjustment computing module 202 adjusts the particular brightness of one or more pixels of the image 210 (712).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
    providing, for display on a display device, a graphical user interface (GUI) having a plurality of pixels representing an image;
    identifying external incoming light that is incident on the display device;
    measuring, by each individual sensor of a plurality of individual sensors of a sensor array that is incorporated with the pixels of the display device, a particular brightness of the incoming light for a grouping of pixels of the plurality of pixels of the display device that is associated with the individual sensor, each grouping of pixels including two or more pixels of the plurality of pixels, wherein each sensor is associated with a differing grouping of pixels of the plurality of pixels of the display device;
    calculating, by a display adjustment computing module, a normal distribution of the brightness of the incoming light across the display device based on the brightness of the incident light corresponding to each pixel grouping of the plurality of pixels of the display device that is measured by the corresponding individual sensor for the pixel grouping;
    determining, by the display adjustment computing module, that a brightness of the incoming light that is incident on a particular grouping of pixels of the display device is greater than the normal distribution of the brightness of the incoming light across the display device; and
    in response to determining that the brightness of the incoming light that is incident on a particular grouping of pixels of the display device is greater than the normal distribution of the brightness of the incoming light across the display device, adjusting, by the display adjustment computing module, the particular brightness of one or more pixels of the image.

2. The computer-implemented method of claim 1, wherein adjusting the particular brightness of the one or more pixels of the image includes decreasing the brightness of the pixels of the image that correspond to the particular grouping of pixels of the display device.

3. The computer-implemented method of claim 1, wherein adjusting the particular brightness of the one or more pixels of the image includes increasing the brightness of the pixels of the image that correspond to other groupings of pixels of the display device outside of the particular grouping of pixels of the display device.

4. The computer-implemented method of claim 1, wherein adjusting the particular brightness of the one or more pixels of the image includes i) decreasing the brightness of the pixels of the image that correspond to the particular grouping of pixels of the display device and ii) increasing the brightness of the pixels of the image that correspond to other groupings of pixels of the display device outside of the particular grouping of pixels of the display device.

5. The computer-implemented method of claim 1, further comprising:
    determining, by the display adjustment computing module, that the brightness of the incoming light that is incident on the particular grouping of pixels of the display device is greater than a threshold brightness; and
    in response to determining that the brightness of the incoming light that is incident on the particular grouping of pixels of the display device is greater than the threshold brightness, adjusting, by the display adjustment computing module, the particular brightness of the one or more pixels of the image.

6. The computer-implemented method of claim 1, further comprising:
    identifying a location of a user with respect to the display device; and
    identifying a location of a light source providing the incoming light that is incident on the display device,
    wherein adjusting the particular brightness of the one or more pixels of the image further includes adjusting the particular brightness of the one or more pixels of the image based on the location of the user and the location of the light source.

7. The computer-implemented method of claim 6, wherein identifying the location of the user includes identifying a viewing angle of the user with respect to a normal of the display device, wherein identifying the location of the light source includes identifying an angle of incidence of the incoming light provided by the light source, and wherein the particular brightness of the one or more pixels of the image is adjusted based on i) the viewing angle of the user and ii) the angle of incidence of the incoming light.

8. An information handling system, comprising:
a display device providing for display a graphical user interface (GUI) having a plurality of pixels representing an image;
a sensor array including a plurality of individual sensors incorporated with the plurality of pixels of the display device, each sensor is associated with a differing grouping of pixels of the plurality of pixels of the display device, each individual sensor of the array of sensors measuring a particular brightness of external incoming light that is incident on the display device for a grouping of pixels of the plurality of pixels of the display device that is associated with the individual sensor, each grouping of pixels including two or more pixels of the plurality of pixels;
a display adjustment computing module configured to:
calculate a normal distribution of the brightness of the incoming light across the display device based on the brightness of the incident light corresponding to each pixel grouping of the plurality of pixels of the display device that is measured by the corresponding individual sensor for the pixel grouping;
determine that a brightness of the incoming light that is incident on a particular grouping of pixels of the display device is greater than the normal distribution of the brightness of the incoming light across the display device; and
adjust, in response to determining that the brightness of the incoming light that is incident on a particular grouping of pixels of the display device is greater than the normal distribution of the brightness of the incoming light across the display device, the particular brightness of one or more pixels of the image.

9. The information handling system of claim 8, wherein adjusting the particular brightness of the one or more pixels of the image includes decreasing the brightness of the pixels of the image that correspond to the particular grouping of pixels of the display device.

10. The information handling system of claim 8, wherein adjusting the particular brightness of the one or more pixels of the image includes increasing the brightness of the pixels of the image that correspond to other groupings of pixels of the display device outside of the particular grouping of pixels of the display device.

11. The information handling system of claim 8, wherein adjusting the particular brightness of the one or more pixels of the image includes i) decreasing the brightness of the pixels of the image that correspond to the particular grouping of pixels of the display device and ii) increasing the brightness of the pixels of the image that correspond to other groupings of pixels of the display device outside of the particular grouping of pixels of the display device.

12. The information handling system of claim 8, the display adjustment computing module is further configured to:
determine that the particular brightness of the one or more pixels of the image is greater than a threshold brightness; and
in response to determining that the particular brightness of the one or more pixels of the image is greater than the threshold brightness, adjust the particular brightness of the one or more pixels of the image.

13. The information handling system of claim 8, further comprising:
a camera that identifies i) a location of a user with respect to the display device and ii) a location of a light source providing the incoming light that is incident on the display device,
wherein the adjustment computing module is configured to adjust the particular brightness of the one or more pixels of the image based on the location of the user and the location of the light source.

14. The information handling system of claim 13, wherein identifying the location of the user includes identifying a viewing angle of the user with respect to a normal of the display device, wherein identifying the location of the light source includes identifying an angle of incidence of the incoming light provided by the light source, and wherein the particular brightness of the one or more pixels of the image is adjusted based on i) the viewing angle of the user and ii) the angle of incidence of the incoming light.

15. A non-transitory computer-readable medium storing software comprising instructions executable by one or more computers which, upon such execution, cause the one or more computers to perform operations comprising:
providing, for display on a display device, a graphical user interface (GUI) having a plurality of pixels representing an image;
identifying external incoming light that is incident on the display device;
measuring, by each individual sensor of a plurality of individual sensors of a sensor array that is incorporated with the pixels of the display device, a particular brightness of the incoming light for a grouping of pixels of the plurality of pixels of the display device that is associated with the individual sensor, each grouping of pixels including two or more pixels of the plurality of pixels, wherein each sensor is associated with a differing grouping of pixels of the plurality of pixels of the display device;
calculating, by a display adjustment computing module, a normal distribution of the brightness of the incoming light across the display device based on the brightness of the incident light corresponding to each pixel grouping of the plurality of pixels of the display device that is measured by the corresponding individual sensor for the pixel grouping;
determining, by the display adjustment computing module, that a brightness of the incoming light that is incident on a particular grouping of pixels of the display device is greater than the normal distribution of the distribution of the brightness of the incoming light across the display device; and
in response to determining that the brightness distribution of the incoming light that is incident on a particular grouping of pixels of the display device is greater than the normal distribution of the brightness of the incoming light across the display device, adjusting, by the display adjustment computing module, the particular brightness of one or more pixels of the image.

16. The computer-readable medium of claim 15, wherein adjusting the particular brightness of the one or more pixels of the image includes decreasing the brightness of the pixels of the image that correspond to the particular grouping of pixels of the display device.

17. The computer-readable medium of claim 15, wherein adjusting the particular brightness of the one or more pixels of the image includes increasing the brightness of the pixels of the image that correspond to other groupings of pixels of the display device outside of the particular grouping of pixels of the display device.

18. The computer-readable medium of claim 15, wherein adjusting the particular brightness of the one or more pixels of the image includes i) decreasing the brightness of the pixels of the image that correspond to the particular grouping of pixels of the display device and ii) increasing the brightness of the pixels of the image that correspond to other groupings of pixels of the display device outside of the particular grouping of pixels of the display device.

19. The computer-readable medium of claim 15, the operations further comprising:
   determining that the particular brightness of the one or more pixels of the image is greater than a threshold brightness; and
   in response to determining that the particular brightness of the one or more pixels of the image is greater than the threshold brightness, adjusting the particular brightness of the one or more pixels of the image.

20. The computer-readable medium of claim 15, the operations further comprising:
   identifying a location of a user with respect to the display device; and
   identifying a location of a light source providing the incoming light that is incident on the display device,
   wherein adjusting the particular brightness of the one or more pixels of the image further includes adjusting the particular brightness of the one or more pixels of the image based on the location of the user and the location of the light source.

\* \* \* \* \*